United States Patent
Cohen et al.

(10) Patent No.: US 7,464,176 B2
(45) Date of Patent: Dec. 9, 2008

(54) MULTICAST SYSTEM AND METHOD FOR DEPLOYING MULTIPLE IMAGES SIMULTANEOUSLY

(75) Inventors: Jason Cohen, Seatac, WA (US); Bruce L. Green, Sammamish, WA (US); Adrian Cosma, Kirkland, WA (US); Wesley G. Miller, Sammamish, WA (US); Rayn Burkhardt, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1142 days.

(21) Appl. No.: 10/603,453

(22) Filed: Jun. 25, 2003

(65) Prior Publication Data

US 2004/0015536 A1  Jan. 22, 2004

Related U.S. Application Data

(63) Continuation-in-part of application No. 10/173,297, filed on Jun. 17, 2002, now Pat. No. 7,017,144, and a continuation-in-part of application No. 10/172,953, filed on Jun. 17, 2002, now Pat. No. 6,947,954.

(51) Int. Cl.
    *G06F 13/00* (2006.01)
(52) U.S. Cl. .................. 709/236; 709/246; 709/203
(58) Field of Classification Search ............. 709/236, 709/246, 203
    See application file for complete search history.

(56) References Cited

U.S. PATENT DOCUMENTS

| | | | |
|---|---|---|---|
| 5,142,680 A | 8/1992 | Ottman et al. | |
| 5,155,594 A | 10/1992 | Bernstein et al. | |
| 5,267,330 A | 11/1993 | Masuda | |
| 5,467,441 A | 11/1995 | Stone et al. | |
| 5,469,573 A | 11/1995 | McGill, III et al. | |
| 5,471,615 A | 11/1995 | Amatsu et al. | |
| 5,485,606 A | 1/1996 | Midgdey et al. | |
| 5,555,416 A | 9/1996 | Owens et al. | |
| 5,655,148 A | 8/1997 | Richman et al. | |
| 5,694,201 A | 12/1997 | Hayashi et al. | |
| 5,713,024 A | 1/1998 | Halladay | |
| 5,748,980 A | 5/1998 | Lipe et al. | |
| 5,794,052 A | 8/1998 | Harding | |
| 6,003,097 A | 12/1999 | Richman et al. | |
| 6,016,400 A | 1/2000 | Day et al. | |
| 6,080,207 A | 6/2000 | Kroening et al. | |
| 6,110,228 A | 8/2000 | Albright et al. | |

(Continued)

OTHER PUBLICATIONS

Zhang et al., "A Modeling Perspective of Image-Based Installation," Dell White Paper, pp. 1-13, Mar. 2002, U.S.A.

(Continued)

*Primary Examiner*—Kenneth R Coulter
(74) *Attorney, Agent, or Firm*—Senniger Powers LLP

(57) ABSTRACT

A system, method and data structure for transmitting a first image including a first software and for transmitting a second image including a second software, wherein the first and second images include common file data. The server simultaneously transmits the common data to first and second destination devices via the shared network. The server is adapted to transmit the first file data to the first destination device via the shared network and the second file data to the second destination device via the shared network.

41 Claims, 6 Drawing Sheets

U.S. PATENT DOCUMENTS

| | | | |
|---|---|---|---|
| 6,138,179 A | 10/2000 | Chrabaszcz et al. | |
| 6,167,562 A | 12/2000 | Kaneko | |
| 6,188,779 B1 | 2/2001 | Baum | |
| 6,247,128 B1 | 6/2001 | Fisher et al. | |
| 6,262,726 B1 | 7/2001 | Stedman et al. | |
| 6,282,711 B1 | 8/2001 | Halpern et al. | |
| 6,286,138 B1 | 9/2001 | Purcell | |
| 6,336,152 B1 | 1/2002 | Richman et al. | |
| 6,377,958 B1 | 4/2002 | Orcutt | |
| 6,385,766 B1 | 5/2002 | Doran, Jr. et al. | |
| 6,411,987 B1 * | 6/2002 | Steger et al. | 709/203 |
| 6,453,413 B1 | 9/2002 | Chen et al. | |
| 6,505,247 B1 * | 1/2003 | Steger et al. | 709/224 |
| 6,512,526 B1 | 1/2003 | McGlothlin et al. | |
| 6,532,474 B2 | 3/2003 | Iwamoto et al. | |
| 6,598,223 B1 | 7/2003 | Vrhel, Jr. et al. | |
| 6,625,625 B1 | 9/2003 | Kihara et al. | |
| 6,681,323 B1 | 1/2004 | Fontanesi et al. | |
| 6,701,513 B1 | 3/2004 | Bailey | |
| 6,711,624 B1 | 3/2004 | Narurkar et al. | |
| 6,721,002 B1 | 4/2004 | Dotsubo et al. | |
| 6,751,357 B2 | 6/2004 | Boon | |
| 6,763,150 B1 | 7/2004 | MacDonald | |
| 6,763,515 B1 | 7/2004 | Vazquez et al. | |
| 6,772,192 B1 | 8/2004 | Fulton et al. | |
| 6,782,402 B1 | 8/2004 | Hidaka et al. | |
| 6,801,936 B1 * | 10/2004 | Diwan | 709/219 |
| 6,868,539 B1 | 3/2005 | Travison et al. | |
| 6,877,154 B2 | 4/2005 | Nagashima et al. | |
| 6,938,211 B1 | 8/2005 | Chang et al. | |
| 6,944,865 B1 | 9/2005 | Zurawski | |
| 6,947,659 B2 | 9/2005 | Nishi et al. | |
| 6,947,954 B2 * | 9/2005 | Cohen et al. | 707/104.1 |
| 7,017,144 B2 * | 3/2006 | Cohen et al. | 717/100 |
| 7,095,522 B2 * | 8/2006 | Lauper et al. | 358/1.15 |
| 7,260,070 B1 * | 8/2007 | Smith | 370/328 |
| 2002/0101612 A1 * | 8/2002 | Lauper et al. | 358/1.15 |
| 2002/0156877 A1 | 10/2002 | Lu et al. | |
| 2002/0174329 A1 | 11/2002 | Bowler et al. | |
| 2002/0188941 A1 | 12/2002 | Cicciarelli et al. | |
| 2002/0194398 A1 | 12/2002 | Bentley et al. | |
| 2003/0074548 A1 | 4/2003 | Cromer et al. | |
| 2003/0233379 A1 | 12/2003 | Cohen et al. | |
| 2004/0070678 A1 | 4/2004 | Toyama et al. | |
| 2004/0218902 A1 | 11/2004 | Yanagita | |

OTHER PUBLICATIONS

White Paper, "Microsoft Windows 2000 Server—Remote Operating System Installation," Microsoft Corporation, pp. i-iv, 1-41, 1999, U.S.A.

Favelu et al., "Image-retrieval agent: integrating image content and text," Oct. 1999, IEEE Intelligent Systems, pp. 36-39.

Render et al., "An Object-Oriented Model of Software Configuration Management," ACM, 1991, pp. 127-139.

* cited by examiner

MULTICAST SYSTEM AND METHOD FOR DEPLOYING MULTIPLE IMAGES SIMULTANEOUSLY

CROSS-REFERENCE TO RELATED APPLICATIONS

This application is a continuation in part of U.S. patent application Ser. No.10/172,953 now U.S. Pat. No. 6,947,954, filed Jun. 17, 2002, entitled IMAGE SERVER STORE SYSTEM AND METHOD USING COMBINED IMAGE VIEWS and U.S. patent application Ser. No. 10/173,297, now U.S. Pat. No. 7,017,144, filed Jun. 17, 2002, entitled COMBINED IMAGE VIEWS AND METHODS OF CREATING IMAGES.

FIELD OF THE INVENTION

The invention generally relates to the duplication of volume images and, in particular, to simultaneous multicasting of two or more images by transmitting the common data of the images, the unique data of each image and the descriptive data of each image.

BACKGROUND OF THE INVENTION

Typically, volume images are large files which cannot be split up. A large scale deployment of these types of images using multicast technology requires that all clients receive the exact same image. If different images are to be applied to different clients, a separate multicast stream is required for each unique image to be provided to one or more clients. This requires substantial bandwidth and, in some respects, defeats the purpose of multicast in the first place.

SUMMARY OF THE INVENTION

Employing the imaging format described in the co-pending patent applications noted here, the descriptive data (metadata) of an image is separated from the actual file data. Since the remaining actual file data is organized by file (instead of being organized by sector, like other imaging solutions), this imaging format can be used to implement a solution according to the invention for multicasting multiple images. Because the descriptive data for each image is relatively small, each client can download the descriptive data from the server via normal means such as unicasting (rather than multicasting). The server will keep a list of all the clients that have downloaded image descriptive data and will stream out (in one stream) all the file data that is required by any of the clients. Every client will receive a unique identifier for each file currently being multicast by the server. If the file is not listed in the previously received descriptive data for a particular client, then the particular client ignores it. Otherwise, it will receive and store the file based on the descriptive data. Once a client has received and stored all the files required to reconstruct the image, it will notify the server that it is finished so that the server will know when to stop streaming out certain file data. Thereafter, the client does not have to do anything more to restore the image at this point. The image is the collection of files. The individual files that it received constitute the image. The client need only place the files in the correct location. Preferably, while it is receiving the files, the client can store the files directly to their final location (unless it needs to do some processing of the received data such as decompression). Even then, the client can store the files in the right location as soon as it is done processing.

Since most images contain similar data with other images, another image can be added in the stream and only slightly increase the time required to transmit the images. For example, if Image 1 is made up of files A,B,C and image 2 is made up of A,B,D (for simplicity, consider sizeof(A)=sizeof(B)=sizeof(C)=sizeof(D)). If it takes 1 unit of time to send each component, for image 1 it would take time=3 and for image 2 it would take time=3. For images 1 and 2 sequentially it would take time=6 (t(1)+t(2)) whereas for images 1 and 2 at the same time according to the invention it would take time=4. (t(A)+t(B)+t(C)+t(D)). The less in common images have, the longer it will take all the clients to receive their entire image. Alternatively, one or more multicast streams can be added. The server automatically tries to balance between client restore time and network bandwidth usage and can be optimized for either.

In one form, the invention is a system for transmitting a first image including a first software and for transmitting a second image including a second software, wherein the first and second images include common file data, wherein the first image includes first file data and wherein the second image includes second file data which is different from the first file data. The system comprises a server; a first destination device; a second destination device; and a shared network linking the server to the first and second destination devices. The server is adapted to simultaneously transmit the common data to the first and second destination devices via the shared network. The server is adapted to transmit the first file data to the first destination device via the shared network and the second file data to the second destination device via the shared network.

In another form, the invention is a method for transmitting a first image including a first software to a first destination device and for transmitting a second image including a second software to a second destination device, wherein the first and second images include common file data, wherein the first image includes first file data and wherein the second image includes second file data which is different from the first file data. The method comprises simultaneously transmitting the common data to the first and second destination devices; transmitting the first file data to the first destination device; and transmitting the second file data to the second destination device.

In another form, the invention is a client side system for receiving a first transmitted image including a first software from a server, the server also transmitting a second image including a second software, wherein the first and second images include common file data, wherein the first image includes first file data and wherein the second image includes second file data which is different from the first file data, wherein the server transmits the first image including the first software and the second image including the second software in a single combined image stream from which the first image and/or the second image can each be re-created by imaging, wherein the server is adapted to transmit via the shared network to the first destination device descriptive data of the first image identifying the common data and first file data, wherein the server is adapted to transmit via the shared network to the first and second destination devices the common data and file data including the first file data and the second file data. The client side system comprises a destination device including a link to the server; software for receiving the descriptive data of the first image; and software for receiving the combined image stream; and software responsive to the received descriptive data of the first image for storing the common file data and the first file data.

In another form, the invention is a client side system for use on a destination device for receiving a first transmitted image including a first software from a server, the server also transmitting a second image including a second software, wherein the first and second images include common file data, wherein the first image includes first file data and wherein the second image includes second file data which is different from the first file data, wherein the server transmits the first image including the first software and the second image including the second software in a single combined image stream from which the first image and/or the second image can each be re-created by imaging, wherein the server is adapted to transmit via the shared network to the first destination device descriptive data of the first image identifying the common data and first file data, wherein the server is adapted to transmit via the shared network to the first and second destination devices the common data and file data including the first file data and the second file data. The client side system comprises software for receiving the descriptive data of the first image; software for receiving the combined image stream; and software responsive to the received descriptive data of the first image for storing the common file data and the first file data.

In another form, the invention is a client side method in which a destination device receives a first transmitted image including a first software from a server, wherein the server also transmits a second image including a second software, wherein the first and second images include common file data, wherein the first image includes first file data and wherein the second image includes second file data which is different from the first file data, wherein the server transmits the first image including the first software and the second image including the second software in a single combined image stream from which the first image and/or the second image can each be re-created by imaging, wherein the server is adapted to transmit via the shared network to the first destination device descriptive data of the first image identifying the common data and first file data, wherein the server is adapted to transmit via the shared network to the first and second destination devices the common data and file data including the first file data and the second file data. The client side method comprises receiving the descriptive data of the first image; and receiving the combined image stream; and storing the common file data and the first file data in response to the received descriptive data of the first image.

In another form, the invention is a server side system for transmitting a first image including a first software and for transmitting a second image including a second software, wherein the first and second images include common file data, wherein the first image includes first file data and wherein the second image includes second file data which is different from the first file data. The system comprises a server linked to first and second destination devices via a shared network. The server is adapted to simultaneously transmit the common data to the first and second destination devices via the shared network. The server is adapted to transmit the first file data to the first destination device via the shared network and the second file data to the second destination device via the shared network.

In another form, the invention is a server side method for transmitting a first image including a first software and for transmitting a second image including a second software, wherein the first and second images include common file data, wherein the first image includes first file data and wherein the second image includes second file data which is different from the first file data. The method comprises simultaneously transmitting the common data to the first and second destination devices via the shared network; and transmitting the first file data to the first destination device via the shared network; and transmitting the second file data to the second destination device via the shared network.

In another form, the invention is a data transmission method of transmitting a first image including a first software and a second image including a second software into a single combined image stream from which the first image and/or the second image can each be re-created by imaging onto a destination device, wherein the first and second images include common file data, wherein the first image includes first file data and wherein the second image includes second file data which is different from the first file data. The method comprises transmitting descriptive data of the first image identifying the common data and first file data; transmitting descriptive data of the second image identifying the common data and second file data; and transmitting the common data and file data including the first file data and the second file data.

In another form, the invention is a modulated data signal having a data structure stored thereon including a first image including a first software and including a second image including a second software, wherein the first and second images include common file data, wherein the first image includes first file data and wherein the second image includes second file data which is different from the first file data. The data structure comprises a first field including the common data; a second field including first file data; and a third field including second file data.

In another form, the invention is a computer readable medium storing instructions for use on a destination device for receiving a first transmitted image including a first software from a server, the server also transmitting a second image including a second software, wherein the first and second images include common file data, wherein the first image includes first file data and wherein the second image includes second file data which is different from the first file data, wherein the server transmits the first image including the first software and the second image including the second software in a single combined image stream from which the first image and/or the second image can each be re-created by imaging, wherein the server is adapted to transmit via the shared network to the first destination device descriptive data of the first image identifying the common data and first file data, wherein the server is adapted to transmit via the shared network to the first and second destination devices the common data and file data including the first file data and the second file data. The instructions comprise software for receiving the descriptive data of the first image; software for receiving the combined image stream; and software responsive to the received descriptive data of the first image for storing the common file data and the first file data.

In another form, the invention is a computer readable medium storing instructions for use on a server for transmitting a first image including a first software and for transmitting a second image including a second software, wherein the first and second images include common file data, wherein the first image includes first file data and wherein the second image includes second file data which is different from the first file data. The instructions comprises software for linking the server to first and second destination devices via a shared network; software for adapting the server to simultaneously transmit the common data to the first and second destination devices via the shared network; and software for adapting the server to transmit the first file data to the first destination device via the shared network and the second file data to the second destination device via the shared network.

DETAILED DESCRIPTION OF THE INVENTION

Figure 1:
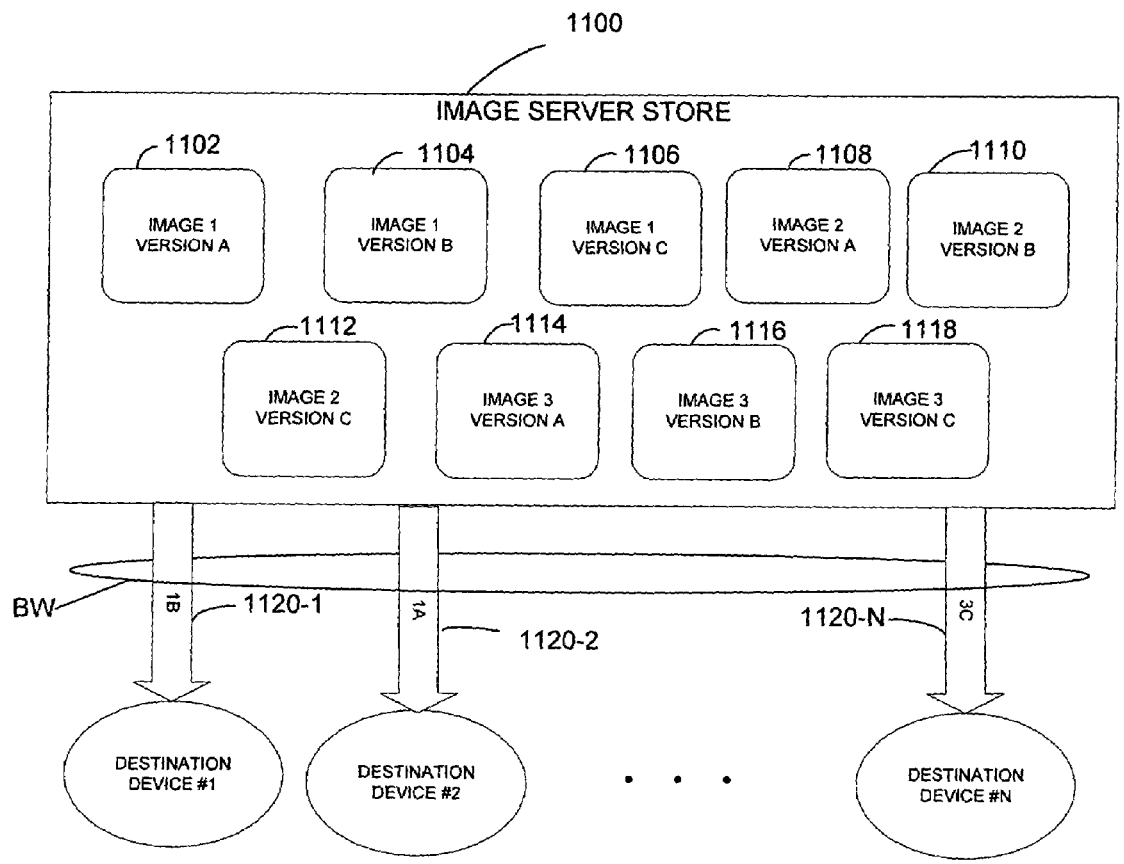
FIG. 1 is a block diagram of an image server storage system according to the prior art wherein each disk image is separately and independently stored on a computer readable medium (CRM) and a separate multicast stream is employed to deliver each image to a destination device.

Referring first to FIG. 1, a block diagram of an image server storage system according to the prior art is illustrated. In general, reference character 1100 refers to a image server store having a plurality of disk images 1102-1118 separately and independently stored on CRM. Many of these images may have common data. For example, images 1102-1106 correspond to versions A, B and C of the same program (image 1), respectively. As another example, images 1108-1112 correspond to versions A, B and C of another program (image 2). As another example, images 1114-1118 correspond to versions A, B and C of another program (image 3). However, each image is separately stored so that it can be transmitted to a destination device such as a destination device #1 through destination device #N.

The image server store 1100 is selectively linked to the plurality of destination devices #1 through #N via a shared network such as a local area network (LAN), wide area network (WAN) or the Internet. This linking, as indicated by arrows 1120, may be a physical interconnection such as a hardware connection or a fiber optic line. In addition or alternatively, this linking may be a wireless interconnection such as a radio frequency (RF) or infrared (IR) transmission. The purpose of this linking is to allow a selected one or more of the images 1102-1118 to be imaged from the image server store 1100 to a selected destination device. For example, if image 1102 of image 1 version A is to be loaded onto destination device #2, image 1102 would be copied to destination device #2 via link 1120-2. If image 1104 of image 1 version B is to be loaded onto destination device #1, image 1104 would be copied to destination device #1, via link 1120-1. If image 1118 of image 3 version C is to be loaded onto destination device #N, image 1118 would be copied to destination device #N via link 1120-N. Thus, this setup allows any one or more images 1120-1118 to be selectively copied to any one or more destination devices #1 through #N via link 1120.

As noted above, one disadvantage of the prior art system illustsrated in FIG. 1 is that a large amount of bandwidth (BW) is needed in order to transmit multiple images simultaneously to a plurality of destination devices. This is because a separate link 1120 is required to transmit each image so that the sum of the bandwidth BW required is approximately the sum of the bandwidth needed for each channel to separately transmit each image. For example, if each image of 450 megabytes (MB) in size will be transmitted over approximately 100 seconds, each image would require 4.5 Mbps of bandwidth. Thus, 9×4.5 Mbps or 40.5 Mbps of bandwidth would be needed to simultaneously transmit all nine (9) images from the server store 1100 to the separate destination devices #1-#9.

Figure 2:
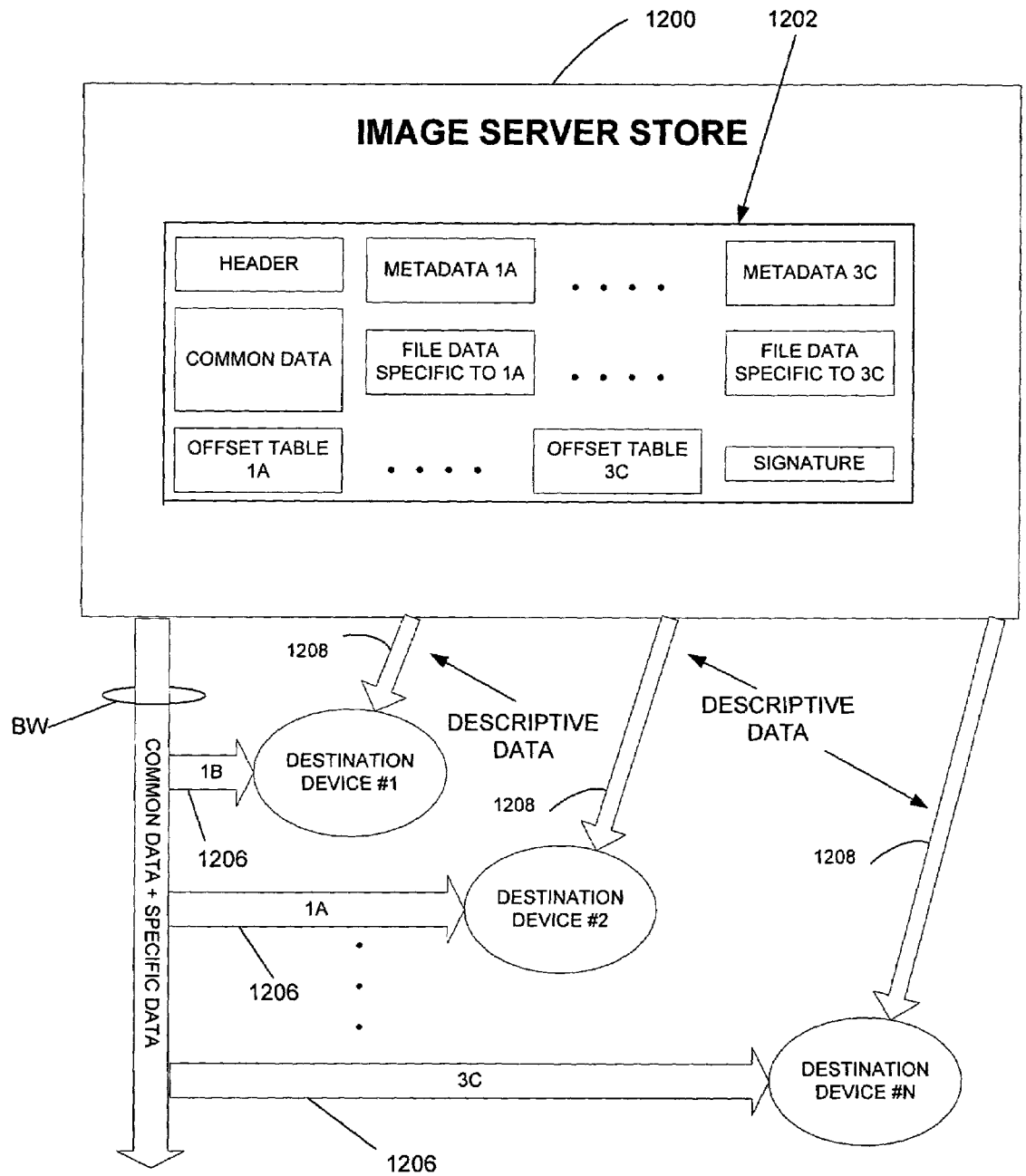
FIG. 2 is a block diagram of an image server storage system according to the invention wherein combined disk images are stored on CRM as one integrated file image and transmitted as a combined, integrated image.

Referring next to FIG. 2, a block diagram of an image server storage system according to the invention is illustrated wherein combined disk images are stored on an image server store 1200 having an integrated or combined image 1202 separately and independently stored on a computer readable medium (CRM). Each integrated image is a combination of various images which share common file data, as described in detail in co-pending U.S. patent application Ser. No. 10/172,953, filed Jun. 17, 2002. entitled IMAGE SERVER STORE SYSTEM AND METHOD USING COMBINED IMAGE VIEWS and co-pending U.S. patent. application Ser. No. 10/173,297 filed Jun. 17, 2002, entitled COMBINED IMAGE VIEWS AND METHODS OF CREATING IMAGES., incorporated herein by reference.

In this example, integrated image 1202 is a combination of versions A, B and C of image 1 and versions A, B and C of image 2 and versions A, B and C of image 3, each of which may be different image editions of the same software program. Common data is only copied once into the integrated image. File data common to versions A, B and C of images 1, 2 and 3 would only appear once within the integrated image 1202. Thus, the integrated image includes a header, descriptive data (metadata files) for versions 1A through 3C, file data files specific to versions 1A to 3C, offset tables for versions 1A through 3C, common data shared by all versions and a signature. Similarly, other integrated images, not shown, may be part of the image server store 1200. In addition, the server store 1200 need not have an integrated image and, instead, can have separate files of the common and specific data.

Each integrated image 1202 is separately stored so that the image or selected portion of the image, as noted below, can be transmitted simultaneously to the destination devices. In particular, the image server store 1200 is selectively linked to a plurality of destination devices #1 through #N. This linking, as indicated by arrows 1206, may be a physical interconnection such as a hardware connection or a fiber optic line. In addition or alternatively, this linking may be a wireless interconnection such as an RF or IR transmission. The purpose of this linking is to allow a selected one or more or part of one or more of the image 1202 or other images on the server store to be transmitted simultaneously from the image server store 1200 to selected destination devices. In fact, the data is provided sequentially and can be received by multiple destination devices simultaneously so that all the devices can simultaneously receive the data.

For example, if image 1102 of image 1 version A is to be loaded onto destination device #2, the header, common data, offset table 1A, metadata 1A, file data specific to 1A and signature (all part of image 1102) must be copied to destination device #2 via link 1206. If image 1104 of image 1 version B is to be loaded onto destination device #1, the header, common data, offset table 1B, metadata 1B, file data specific to 1B and signature (all part of image 1104) must be copied to destination device #1 via link 1206. If image 1118 of image 3 version C is to be loaded onto destination device #N, the header, common data, offset table 3C, metadata 3C, file data specific to 3C and signature (all part of image 1118) must be copied to destination device #N via link 1206. Thus, for all three images to be copied to the three different devices (#1, #2 and #N), common data must be provided. According to the invention the common data may be simultaneously transmitted to all three different devices (#1, #2 and #N). As a result, less bandwidth in needed to transmit the three different images to the three different devices and the images can be transferred faster than in the example of FIG. 1.

In one embodiment, all data is sent sequentially so that descriptive data (e.g., header, offset table, metadata and signature) would be sent first followed by the common data and the specific data (in any order). In the prior example, the information may be sent in the following sequence: the header, offset table 1A, metadata 1A, offset table 1B, metadata 1B, offset table 3C, metadata 3C, signature, common data, file data specific to 1A, file data specific to 1B, and file data specific to 3C.

Device #2 would receive and store the header, offset table 1A, metadata 1A, signature, common data and file data specific to 1A. Device #1 would receive and store the header, offset table 1B, metadata 1B, signature, common data and file data specific to 1B. Device #N would receive and store the header, offset table 3C, metadata 3C, signature, common data, and file data specific to 3C.

Another scenario which is contemplated is round robin multicasting where common and specific data is continuously, sequentially transmitted and retransmitted and devices receive the data when the next cycle of transmission occurs.

This round robin multicasting may be varied depending on the requests for software to be transmitted. For example, a plurality of devices may request images 1A and 1B and the server would continue to repeatedly deliver a stream of data including the common data, data specific to 1A and data specific to 1B. During this transmission, one or more additional devices may request image 2B. As a result, the server would add data specific to 2B to each cycle of transmission and would repeatedly deliver a stream of data including the common data, data specific to 1A, data specific to 1B and data specific to 2B.

It is also contemplated that in any and all scenarios some or all data may be sent simultaneously over the same or separate channels. For example, the descriptive data may be transmitted separately to each destination device via channel 1208 in response to a specific request from a device. Simultaneously, the common data and file specific data would be transmitted via a separate channel 1206. After a destination device receives the descriptive data from channel 1208, it would download the corresponding data from channel 1206. As an example, suppose server 1200 supplies images 1A, 1B, 1C, 2A, 2B, 2C, 3A, 3B and 3C. On channel 1206, server 1200 would sequentially, repeatedly transmit the following: common data, data specific to 1A, data specific to 1B, data specific to 1C, data specific to 2A, data specific to 2B, data specific to 2C, data specific to 3A, data specific to 3B and data specific to 3C. Also, suppose device #2 requests a copy of image 1A. Server 1200 would provide via link 1208 to device #2 the following descriptive data: header, offset table 1A, metadata 1A and signature. Device #2 would then connect to channel 1206 to wait for the next cyclic transmission of the common data and file data specific to 1A as identified by the descriptive data. Device #2 would receive and store the common data and the file data specific to 1A when the next cyclic transmission occurs.

Channel 1206 may in fact be two channels, one which carries common data retransmitted over and over again and one channel which carries file specific data from a plurality of files which sequentially transmitted over and over again. Also, channel 1206 may in fact be multiple channels, several channels which carry part or all the common data retransmitted over and over again at varying time intervals and rates and one or more channels which carry file specific data from a plurality of files which sequentially transmitted over and over again.

Thus, this configuration allows any one or more images 1102-1118 to be selectively, simultaneously copied to any one or more destination devices #1 through #N via link 1206 with substantially less bandwidth.

The invention makes it easier for the server 1200 to link with more destination devices over low bandwidth connections. (whereas before every new destination device would require additional bandwidth). According to the invention, only the data that is unique to a new image being requested or the delta to the image being requested needs to be added to the transmission cycle. For example, suppose each of the images 1102-1118 includes 350 MB of common filed data and 100 MB of unique data to be transferred over 100 seconds so that a bandwidth of 450 MB/100 sec times nine images or 40.5 MBps of bandwidth would be required for the nine images to be transmitted by the prior art system of FIG. 1. In contrast, the system of FIG. 2 would transmit the 350 MB of common data and 900 MB of unique data and would only require 350 MB/100 sec plus 900 MB/100 sec or 12.5 MBps of bandwidth to transmit all nine images.

An example of a descriptive data structure (metadata files) which may be provided is as follows:

```
<METAINFO>
    <WIMFILE>
        <DESCRIPTION></>
        <COMPRESSION></>
        <USERINFO></>
    </WIMFILE>
    <IMAGES>
        <IMAGE>
            <DESCRIPTION></>
            <FLAGS></>
            <FILECOUNT></>
            <DIRCOUNT></>
            <IMAGEBYTES></>
            <CREATETIME></>
            <USERINFO></>
        </IMAGE>
    </IMAGES>
</METAINFO>
```

Figure 3:
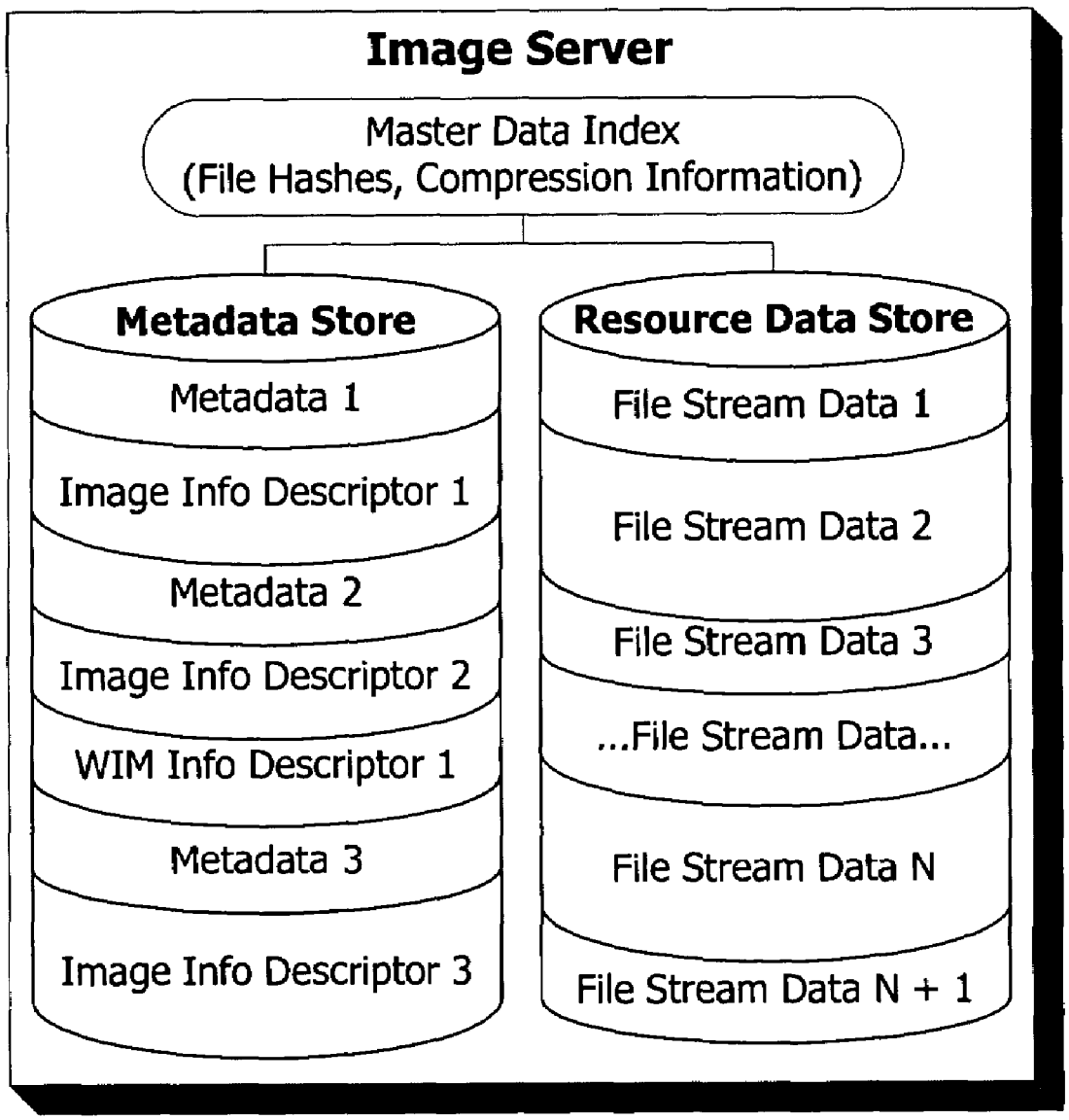
FIG. 3 is a block diagram of an image server according to the invention including a master data index which includes file hashes and compression information.

FIG. 3 is a block diagram of an image server according to the invention including a master data index which includes file hashes and compression information.

Figure 4:
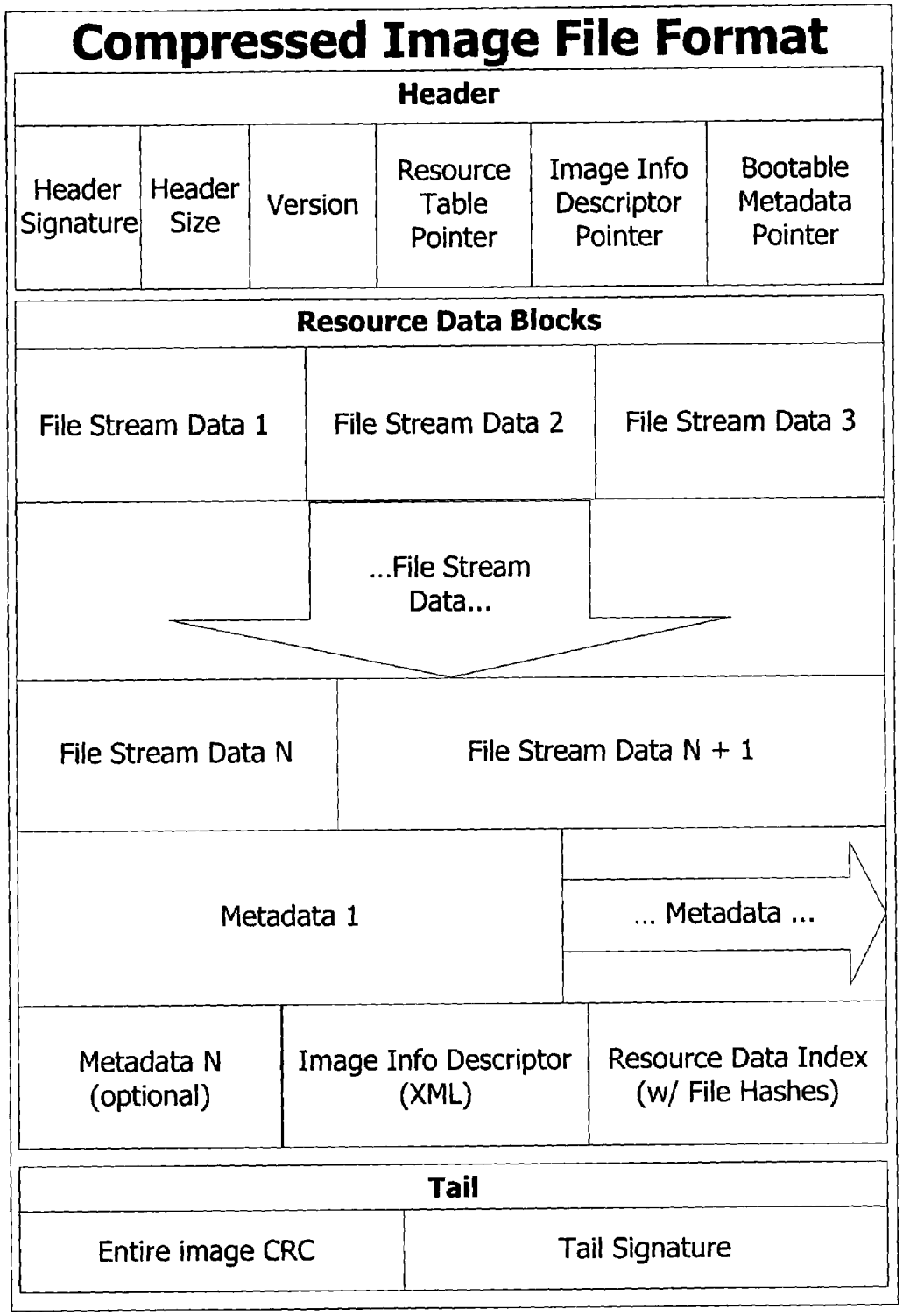
FIG. 4 is a block diagram of a compressed image file content.

FIG. 4 is a block diagram of a compressed image file content.

Figure 5:
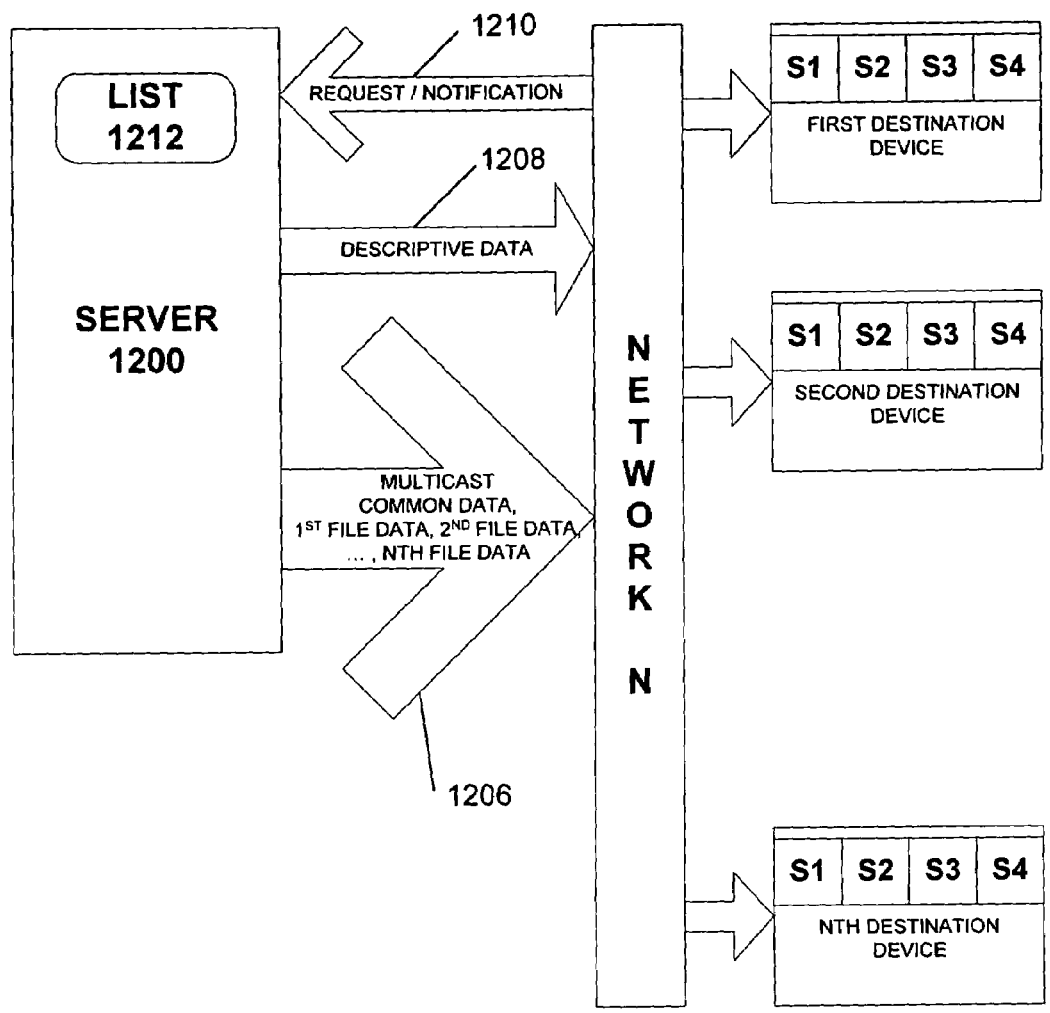
FIG. 5 is a block diagram illustrating various transmissions according to the invention.

Referring next to FIG. 5, operation of the system according to the invention is illustrated. The server 1200 transmits the first image including the first software and the second image including the second software in a single combined image stream 1206 from which the first image and/or the second image can each be re-created by imaging. In particular, the server is adapted to transmit first descriptive data to the first destination device via the shared network N. As noted above, the first descriptive data identifies the common data and first file data of the first image. In addition, the server 1200 is adapted to transmit second descriptive data to the second destination device via the shared network. As noted above, the second descriptive data identifies the common data and second file data of the second image.

From the client perspective, the first destination device receives the first descriptive data via link 1208 which defines the common data and the first file data of the first image. Similarly, the second destination device receives the second descriptive data via link 1208 which defines the common data and the second file data of the second image.

As illustrated in FIG. 5, it is contemplated that different channels may be employed to transmit the descriptive data and the common data. Thus, separate arrows 1206 and 1208 are used in FIG. 5 to illustrate this. In addition, a separate channel 1210 may be employed to transmit information (request/notification) from the destination devices to the server. However, it is also contemplated that these separate channels may be integrated into a one or more channels having multiple subchannels or that all the data and information may be multiplexed over a single stream.

As shown in FIG. 5, the server multicasts the common data, the first file data, the second file data, . . . , and the Nth file data simultaneously to the first, second, . . . , N destination devices, respectively. Multicasting means the process of sending the various data and information being transmitted simultaneously to more than one destination (e.g., device) on a network.

It is also contemplated that, separate from the multicasting, the server directly transmits the first descriptive data to the first destination device, the second descriptive data to the second destination device, and so on via link 1208. This direct transmission is the process of sending the descriptive data to one destination (e.g., device) at a time. Alternatively, the descriptive data may be transmitted by multicasting.

In order for the server 1200 to know what information and data to transmit, it maintains a list 1212 of destination devices and images to be transmitted to the destination devices on the list. Depending on the list, the server 1200 multicasts common data and file data corresponding to the images to be transmitted to the destination device on the list.

For example, if the first destination device sends a request to the server 1200 or otherwise indicates to the server that it wants to download the first image, the server will add the first destination device requiring the first image to the list. Similarly, if the second destination device sends a request to the server or otherwise indicates to the server that it wants to download the second image, the server will add the second destination device requiring the second image to the list.

Similarly, if the Nth destination device sends a request to the server or otherwise indicates to the server that it wants to download the Nth image, the server will add the Nth destination device requiring the Nth image to the list.

As a result, the server multicasts the common data, the first file data, the second file data and the Nth file data to the first destination device, second destination device and the Nth destination device. Each data or subpacket of data is transmitted with a unique identifier which is part of the descriptive data so that each destination device is able to identify the data that it requires.

The first descriptive data previously received by the first destination device includes the unique identifiers of the common data and first file data of the first image. The first destination device uses these unique identifiers to identify the portions of the multicast which include the common data and the first file data and stores only the common data and first file data as indicated by their unique identifiers. Thus, the first destination device receives the common data, the first file data and the second file data. The other destination devices function similarly to receive their images.

When the first destination device has received the common data and the file data corresponding to the first descriptive data, it provides a notification via channel 1210 to the server. In particular, when the first destination device has received all the common data and first file data of the image, so that it can restore the first software from the first image, it provides a first notification to the server 1200. The server, in response to the first notification, removes the first destination device from the list. The server will discontinue multicasting the file data of the first image, unless another destination device on the list has requested the first image. Thus, the server's response to the first notification depends on the remaining destination devices and the images required that remain on the list. The remaining destination devices and their interaction with the server are similar to the first destination device. Once a destination device receives all the data of a particular descriptive data, it reconstructs the image corresponding to the particular descriptive data.

It is contemplated that the server may transmit a plurality of multicast streams including common and/or descriptive data and that the server selects a number of multicast streams as a function of destination device restore time and as a function of total bandwidth of the streams being transmitted.

Thus, the system of the invention employs a method for transmitting a first image including a first software to a first destination device and for transmitting a second image including a second software to a second destination device. The common data is simultaneously transmitted to the first and second destination devices. The first file data is transmitted to the first destination device and the second file data is transmitted to the second destination device.

A method according to the invention includes transmitting the first image including the first software and the second image including the second software in a single combined image stream from which the first image and/or the second image can each be re-created by imaging. In particular, first descriptive data of the first image identifying the common data and first file data is transmitted to the first destination device via link 1208. Similarly, second device descriptive data of the second image identifying the common data and second file data is transmitted to the second destination device via link 1208. In response, the first destination device receives via stream 1206 the common data and the first file data as defined by the first descriptive data previously transmitted to the first destination device. In addition, the second destination device receives via stream 1206 the common data and the second file data as defined by the second descriptive data previously transmitted to the second destination device.

In addition, the system and method of the invention provide the ability to prioritize clients. The above describes a two-client scenario. However, the invention is applicable to two or more clients and clients may be prioritized. As additional clients come on-line, the order of files being transmitted may be modified based on the priority of clients that are on-line at any particular time. This priority can be established by a list of files according to priority, a list of clients according to priority, a list of client locations accoridng to priority or any other means for establishing a priority.

Alternatively or in addition, a client may indicate its priority to the server. In any case, the server is configured to sequentially transmit the file data in a sequence defined by the established priority.

Prioritizing clients and/or files means thtat the server controls which clients are have all their files first. For example, a new client may come online and the new client may have need for unique data and may have a priority that is higher than other clients on line. In this example, the server can be configured to broadcast the unique data of the new client first, before the unique data of other on-line clients. This scenario becomes particulary useful when serving a large number of client (e.g., 100 or more clients) and a new client comes on-line that requires an image so that it can get done faster than the other clients. In this latter scenario, the server can broadcast the unique data required by the new client first before broadcasting the unique data of the other clients (e.g., the remaining 100 or more clients).

In one embodiment, each destination device comprises a client side system which receives a first transmitted image including a first software from the server. The server also transmits a second image including a second software, such that the first and second images include common file data. The client side system includes a destination device including a link to the server, software S1 for receiving the descriptive data of the first image, software S2 for receiving the combined image stream, and software S3 responsive to the received descriptive data of the first image for storing the common file data and the first file data. In addition, the client side system includes software S4 for restoring the image. Thus, a client side method comprises receiving the descriptive data of the first image and receiving the combined image stream; and storing the common file data and the first file data in response to the received descriptive data of the first image.

According to one aspect of the invention, a server side system transmits a first image including a first software and transmits a second image including a second software. The server is adapted to simultaneously transmit the common data to the first and second destination devices via the shared network. In addition, the server is adapted to transmit the first file data to the first destination device via the network and the second file data to the second destination device via the network. Thus, a server side method comprises simultaneously transmitting the common data to the first and second destination devices via the network; and transmitting the first file data to the first destination device via the network; and transmitting the second file data to the second destination device via the network.

According to one aspect of the invention, a data transmission method is provided for transmitting a first image including a first software and a second image including a second software into a single combined image stream from which the first image and/or the second image can each be re-created by imaging onto a destination device. The method comprises transmitting descriptive data of the first image identifying the common data and first file data; transmitting descriptive data of the second image identifying the common data and second file data; and transmitting the common data and file data including the first file data and the second file data. As noted above, the transmitting of the descriptive data may be on a different channel that the transmitting of the common data and the file data. As noted above, the transmitting of the common data and the file data may be sequentially transmitting the common data, the first file data and the second file data. As a result, the modulated data signal has a data structure stored thereon including a first image including a first software and including a second image including a second software. For example, the data structure may include a first field including the common data, a second field including first file data and a third field including second file data.

Figure 6:
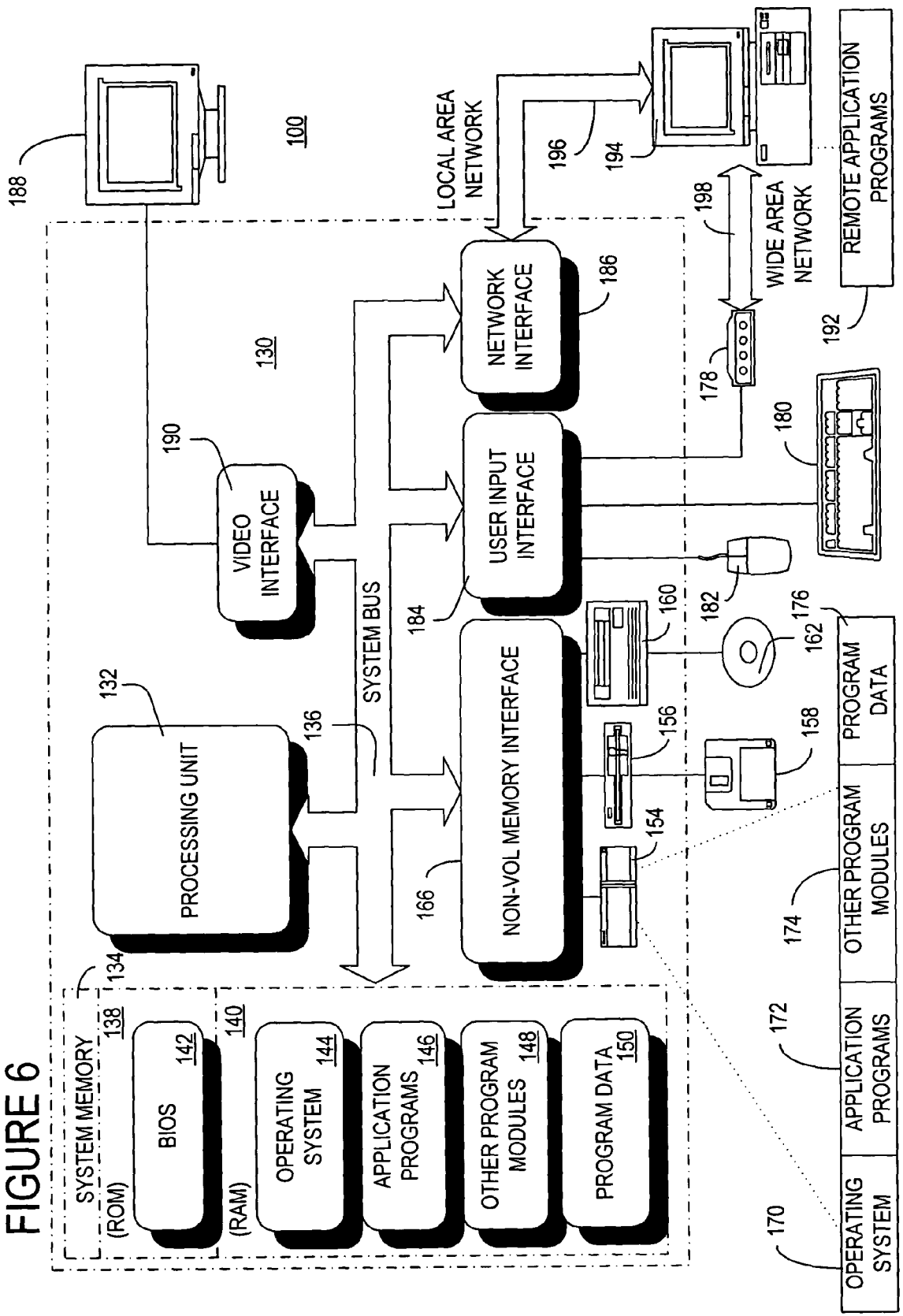
FIG. 6 is a block diagram illustrating one example of a suitable computing system environment in which the invention may be implemented as an image server store and/or as a destination device.

FIG. 6 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 6 illustrates operating system 144, application programs 146, other program modules 148, and program data 150.

The computer 130 may also include other removable/non-removable, volatile/nonvolatile computer storage media. For example, FIG. 6 illustrates a hard disk drive 154 that reads from or writes to non-removable, nonvolatile magnetic media. FIG. 6 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 6, provide storage of computer readable instructions, data structures, program modules and other data for the computer 130. In FIG. 6, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 6 include a local area network (LAN) 196 and a wide area network (WAN) 198, but may also include other networks. LAN 136 and/or WAN 138 can be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 6 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A system comprising:
   a first volume image including a first software wherein the first volume image includes common file data, and first file data;

a second volume image including a second software wherein the second volume image includes the common file data and second file data which is different from the first file data;
a server;
a first destination device;
a second destination device;
a shared network linking the server to the first and second destination devices;
wherein the server is adapted to simultaneously transmit the common data to the first and second destination devices via the shared network;
wherein the server simultaneously transmits the first file data to the first and second destination devices via the shared network and wherein the server simultaneously transmits the second file data to the first and second destination devices via the shared network;
wherein the server simultaneously transmits the first volume image including the first software and the second volume image including the second software in a single image stream from which the first volume image and the second volume image can each be re-created by imaging;
wherein the server simultaneously transmits first descriptive data to the first and second destination devices via the shared network, said first descriptive data identifying the common data and first file data of the first volume image;
wherein the server simultaneously transmits second descriptive data to the first and second destination devices via the shared network, said second descriptive data identifying the common data and second file data of the second volume image; and
wherein the first destination device stores only the common data and the first file data in response to the first descriptive data received from the server while simultaneously the second destination device stores only the common data and the second file data in response to the second descriptive data received from the server;
wherein the server simultaneously, directly multicasts the common data, the first file data and the second file data to both the first and second destination devices and wherein the first destination device re-creates the first volume image from the common file data and the first file data simultaneously while the second destination device re-creates the second volume image from the common data and the second file data.

2. The system of claim 1 wherein the server directly transmits the first descriptive data to the first destination device and the server directly transmits the second descriptive data to the second destination device.

3. The system of claim 1 wherein the server maintains a list of destination devices and the common data of the images to be transmitted to destination devices on the list and multicasts common data and file data corresponding to the images to be transmitted to destination device on the list.

4. The system of claim 3 wherein the first destination device provides a first notification to the server when the first destination device has received the common data and the file data corresponding to the first descriptive data.

5. The system of claim 4 wherein the server, in response to the first notification, removes the first destination device from the list and discontinues multicasting the file data of the first volume image, unless another destination device has requested the first volume image.

6. The system of claim 4 wherein the server, in response to the second notification, removes the second destination device from the list and discontinues multicasting the common data of the second volume image, unless another destination device has requested volume image which includes the common data.

7. The system of claim 4 wherein the first destination device reconstructs the volume image corresponding to the first descriptive data.

8. The system of claim 1 wherein the server multicasts the common data, the first file data and the second file data to the first and second destination devices including a unique identifier for the data currently being transmitted.

9. The system of claim 8 wherein the first destination device receives the common data, the first file data and the second file data and stores only the common data and first file data as indicated by the unique identifier.

10. The system of claim 1 wherein the server is adapted to transmit a plurality of multicast streams including common and/or descriptive data and wherein the servers selects a number of multicast streams as a function of destination device restore time and as a function of total bandwidth of the streams being transmitted.

11. The system of claim 1 wherein the server is configures to sequentially transmit the file data in a sequence defined by a priority.

12. The system of claim 1 for transmitting a third volume image including a third software, wherein the first and third volume images include common file data, wherein the third volume image includes third file data which is different from the first file data and which is different from the second file data, said system farther comprising:
a third destination device;
said shared network linking the server to the third destination device;
wherein the server is adapted to simultaneously transmit the common data to the first, second and third destination devices via the shared network; and
wherein the server is adapted to transmit the third file data to the third destination device via the shared network.

13. A method for transmitting a first volume image including a first software from an image server store to a first destination computing device linked to the image server store through a shared network and for transmitting a second volume image including a second software from the image server store to a second destination computing device linked to the image server store through a shared network, wherein the first and second volume images include common file data, wherein the first volume image includes first file data and wherein the second volume image includes second file data which is different from the first file data, said method comprising:
simultaneously transmitting the common data to the first and second destination computing devices;
simultaneously transmitting the first file data to the first destination computing device and transmitting the second file data to the second destination computing device;
simultaneously transmitting the first volume image including the first software and the second volume image including the second software in a single volume image stream from which the first volume image and/or the second volume image can each be re-created by imaging;
simultaneously transmitting to the first destination device first descriptive data of the first volume image identifying the common data and first file data and transmitting to the second destination computing device second descriptive data of the second volume image identifying the common data and second file data;

storing by the first destination computing device the common data and the first file data in response to the first descriptive data received while simultaneously storing by the second destination computing device the common data and the second file data in response to the second descriptive data received; and directly transmitting the first descriptive data to the first destination computing device while simultaneously directly transmitting the second descriptive data to the second destination computing device.

14. The method of claim 13 further comprising multicasting the common data, the first file data and the second file data simultaneously to the first and second destination devices.

15. The method of claim 13 further comprising maintaining a list of destination devices and volume images to be transmitted to destination devices on the list and multicasting common data and file data corresponding to the volume images to be transmitted to destination device on the list.

16. The method of claim 15 wherein the first destination device provides a first notification to the server when the first destination device has received the common data and the file data corresponding to the first descriptive data.

17. The method of claim 16 wherein, in response to the first notification, removing the first destination device from the list and discontinuing multicasting the file data of the first volume image, unless another destination device has requested the first volume image.

18. The method of claim 16 wherein, in response to the second notification, removing the second destination device from the list and discontinuing multicasting the common data of the second volume image, unless another destination device has requested volume image which includes the common data.

19. The method of claim 16 wherein the first destination device reconstructs the volume image corresponding to the first descriptive data.

20. The method of claim 13 further comprising multicasting the common data, the first file data and the second file data to the first and second destination devices including a unique identifier for the data currently being transmitted.

21. The method of claim 20 wherein the first destination device receives the common data, the first file data and the second file data and stores only the common data and first file data as indicated by the unique identifier.

22. The method of claim 13 transmitting a plurality of multicast streams including common and/or descriptive data and selecting a number of multicast streams as a function of destination device restore time and as a function of total bandwidth of the streams being transmitted.

23. The method of claim 13 further comprising sequentially transmitting the file data in a sequence defined by a priority.

24. The method of claim 13 for transmitting a third volume image including a third software, wherein the first and third images include common file data, wherein the third image includes third file data which is different from the first file data and which is different from the second file data, said method further comprising:

simultaneously transmitting the common data to the first, second and third destination devices via the shared network; and transmitting the third file data to the third destination device via the shared network.

25. A client side system for receiving a first transmitted volume image including a first software from a server, the server also transmitting a second volume image including a second software, wherein the first and second volume images include common file data, wherein the first volume image includes first file data and wherein the second volume image includes second file data which is different from the first file data, wherein the server transmits the first volume image including the first software and the second volume image including the second software in a single volume image stream from which the first volume image and/or the second volume image can each be re-created by imaging, wherein the server is adapted to transmit via the shared network to the first destination device descriptive data of the first volume image identifying the common data and first file data, wherein the server is adapted to transmit via the shared network to the first and second destination devices the common data and file data including the first file data and the second file data; said client side system comprising:

a destination computing device including:
a link to the server;
software for receiving the descriptive data of the first volume image; and
software for receiving the volume image stream; and
software responsive to the received descriptive data of the first volume image for storing the common file data and the first file data;
wherein the server simultaneously directly transmits the first descriptive data to the first destination device and the server directly transmits the second descriptive data to the second destination device and wherein the server multicasts the common data, the first file data and the second file data simultaneously to the first and second destination devices;
wherein the first destination device stores only the common data and the first file data in response to the first descriptive received from the server while simultaneously the second destination device stores only the common data and the second file data in response to the second descriptive data received from the server; and
wherein the first destination device re-creates the first volume image from the common file data and the first file data simultaneously while the second destination device re-creates the second volume image from the common data and the second file data.

26. The client side system of claim 25 for transmitting a third volume image including a third software, wherein the first and third volume images include common file data, wherein the third volume image includes third file data which is different from the first file data and which is different from the second file data, said system further comprising:

a third destination device;
said shared network linking the server to the third destination device;
wherein the server is adapted to simultaneously transmit the common data to the first, second and third destination devices via the shared network; and
wherein the server is adapted to transmit the third file data to the third destination device via the shared network.

27. A client side method in which a destination computing device receives a first transmitted volume image including a first software from an image server store, wherein the image server store also transmits a second volume image including a second software, wherein the first and second volume images include common file data, wherein the first volume image includes first file data and wherein the second volume image includes second file data which is different from the first file data, wherein the image server store transmits the first volume image including the first software and the second volume image including the second software in a single volume image stream from which the first volume image and/or the second volume image can each be re-created by imaging, wherein the image server store is adapted to transmit via the shared network to the first destination computing device descriptive data of the first volume image identifying the common data and first file data, wherein the image server store is adapted to transmit via the shared network to the first and second destination computing devices the common data and file data including the first file data and the second file data; said client side method comprising:

receiving the descriptive data of the first volume image; and receiving the volume image stream; and storing the common file data and the first file data in response to the received descriptive data of the first volume image;

wherein the server simultaneously directly transmits the first descriptive data to the first destination computing device and the server directly transmits the second descriptive data to the second destination computing device and wherein the server multicasts the common data, the first file data and the second file data simultaneously to the first and second destination computing devices;

wherein the first destination computing device stores only the common data and the first file data in response to the first descriptive data received from the server while simultaneously the second destination computing device stores only the common data and the second file data via in response to the second descriptive data received from the server; and wherein the first destination computing device re-creates the first volume image from the common file data and the first file data simultaneously while the second destination computing device re-creates the second volume image from the common data and the second file data.

28. A server side system for transmitting a first volume image including a first software and for transmitting a second volume image including a second software, wherein the first and second volume images include common file data, wherein the first volume image includes first file data and wherein the second volume image includes second file data which is different from the first file data, said system comprising:

a server linked to first and second destination devices via a shared network;

wherein the server is adapted to simultaneously transmit the common data to the first and second destination devices via the shared network;

wherein the server is adapted to transmit the first file data to the first destination device via the shared network and the second file data to the second destination device via the shared network;

said server simultaneously transmitting the first volume image including the first software and the second volume image including the second software in a single volume image stream from which the first volume image and/or the second volume image can each be re-created by imaging;

wherein the server simultaneously transmits first descriptive data to the first destination device via the shared network, said first descriptive data identifying the common data and first file data of the first volume image and the server transmits second descriptive data to the second destination device via the shared network, said second descriptive data identifying the common data and second file data of the second volume image;

wherein the server simultaneously directly transmits the first descriptive data to the first destination device and the server directly transmits the second descriptive data to the second destination device; and wherein the server simultaneously multicasts the common data, the first file data and the second file data simultaneously to the first and second destination devices.

29. The server side system of claim 28 wherein the server maintains a list of destination devices and volume images to be transmitted to destination devices on the list and multicasts common data and file data corresponding to the volume images to be transmitted to destination device on the list.

30. The server side system of claim 28 wherein the server is adapted to transmit a plurality of multicast streams including common and/or descriptive data and wherein the servers selects a number of multicast streams as a function of destination device restore time and as a function of total bandwidth of the streams being transmitted.

31. The server side system of claim 28 wherein the server is configures to sequentially transmit the file data in a sequence defined by a priority.

32. The server side system of claim 28 for transmitting a third volume image including a third software to a third destination device, wherein the first and third volume images include common file data, wherein the third volume image includes third file data which is different from the first file data and which is different from the second file data, said system further comprising:

said shared network linking the server to the third destination device;

wherein the server is adapted to simultaneously transmit the common data to the first, second and third destination devices via the shared network; and wherein the server is adapted to transmit the third file data to the third destination device via the shared network.

33. A server side method for transmitting a first volume image including a first software from an image server store and for transmitting a second volume image including a second software from an image server store, wherein the first and second volume images include common file data, wherein the first volume image includes first file data and wherein the second volume image includes second file data which is different from the first file data, said method comprising:

simultaneously transmitting the common data to the first and second destination computing devices via the shared network; and simultaneously transmitting the first file data to the first destination computing device via the shared network and transmitting the second file data to the second destination computing device via the shared network;

simultaneously transmitting the first volume image including the first software and the second volume image including the second software in a single volume image stream from which the first volume image and/or the second volume image can each be re-created by imaging simultaneously transmitting first descriptive data to the first destination computing device via the shared network, said first descriptive data identifying the common data and first file data of the first volume image and transmitting second descriptive data to the second destination computing device via the shared network, said second descriptive data identifying the common data and second file data of the second volume image;

directly simultaneously transmitting the first descriptive data to the first destination computing device and directly transmitting the second descriptive data to the second destination computing device; and multicasting the common data, the first file data and the second file data simultaneously to the first and second destination computing devices.

34. The server side method of claim 33 further comprising maintaining a list of destination devices and volume images to be transmitted to destination devices on the list and multicasting common data and file data corresponding to the volume images to be transmitted to destination device on the list.

35. The server side method of claim 33 further comprising transmitting a plurality of multicast streams including common and/or descriptive data and wherein the servers selects a number of multicast streams as a function of destination device restore time and as a function of total bandwidth of the streams being transmitted.

36. The server side method of claim 33 further comprising sequentially transmitting the file data in a sequence defined by a priority.

37. The server side method of claim 33 for transmitting a third volume image including a third software to a third destination device, wherein the first and third volume images include common file data, wherein the third volume image includes third file data which is different from the first file data and which is different from the second file data, said method further comprising:

simultaneously transmitting the common data to the first, second and third destination devices via the shared network; and transmitting the third file data to the third destination device via the shared network.

38. A data transmission method of transmitting a first volume image including a first software from an image server store and a second volume image including a second software from an image server store into a single volume image stream from which the first volume image and/or the second volume image can each be re-created by imaging onto a destination computing device linked to the image server store through a shared network, wherein the first and second volume images include common file data, wherein the first volume image includes first file data and wherein the second volume image includes second file data which is different from the first file data, said method comprising:

transmitting descriptive data of the first volume image identifying the common data and first file data;

transmitting descriptive data of the second volume image identifying the common data and second file data; and transmitting the common data and file data including the first file data and the second file data;

wherein the transmitting of the descriptive data is on a different channel than a channel on which the common data and the file data are transmitted;

wherein the transmitting of the common data and the file data comprising sequentially transmitting the common data, the first file data and the second file data;

transmitting the first volume image including the first software and the second volume image including the second software in a single volume image stream from which the first volume image and/or the second volume image can each be re-created by imaging;

transmitting first descriptive data to the first destination computing device via the shared network, said first descriptive data identifying the common data and first file data of the first volume image; and transmitting second descriptive data to the second destination computing device via the shared network, said second descriptive data identifying the common data and second file data of the second volume image;

directly transmitting the first descriptive data to the first destination computing device and directly transmitting the second descriptive data to the second destination computing device; and multicasting the common data, the first file data and the second file data simultaneously to the first and second destination computing devices.

39. The data transmission method of claim 38 further comprising transmitting a plurality of multicast streams including common and/or descriptive data and selecting a number of multicast streams as a function of destination device restore time and as a function of total bandwidth of the streams being transmitted.

40. The data transmission method of claim 38 further comprising sequentially transmitting the file data in a sequence defined by a priority.

41. The data transmission method of claim 38 for transmitting a third image including a third software to a third destination device, wherein the first and third images include common file data, wherein the third image includes third file data which is different from the first file data and which is different from the second file data, said method further comprising:

simultaneously transmitting the common data to the first, second and third destination devices via the shared network; and transmitting the third file data to the third destination device via the shared network.

* * * * *

UNITED STATES PATENT AND TRADEMARK OFFICE
CERTIFICATE OF CORRECTION

| | | |
|---|---|---|
| PATENT NO. | : 7,464,176 B2 | |
| APPLICATION NO. | : 10/603453 | |
| DATED | : December 9, 2008 | |
| INVENTOR(S) | : Cohen et al. | |

It is certified that error appears in the above-identified patent and that said Letters Patent is hereby corrected as shown below:

Title Page, Item (75), Inventors:

"Rayn Burkhardt, Redmond, WA (US)"

should read

-- Ryan Burkhardt, Redmond, WA (US) --.

Signed and Sealed this

Fourth Day of August, 2009

JOHN DOLL
*Acting Director of the United States Patent and Trademark Office*